Aug. 20, 1968    W. J. HASSELBERG    3,397,871
CARBONATOR
Filed Oct. 22, 1965    3 Sheets-Sheet 3
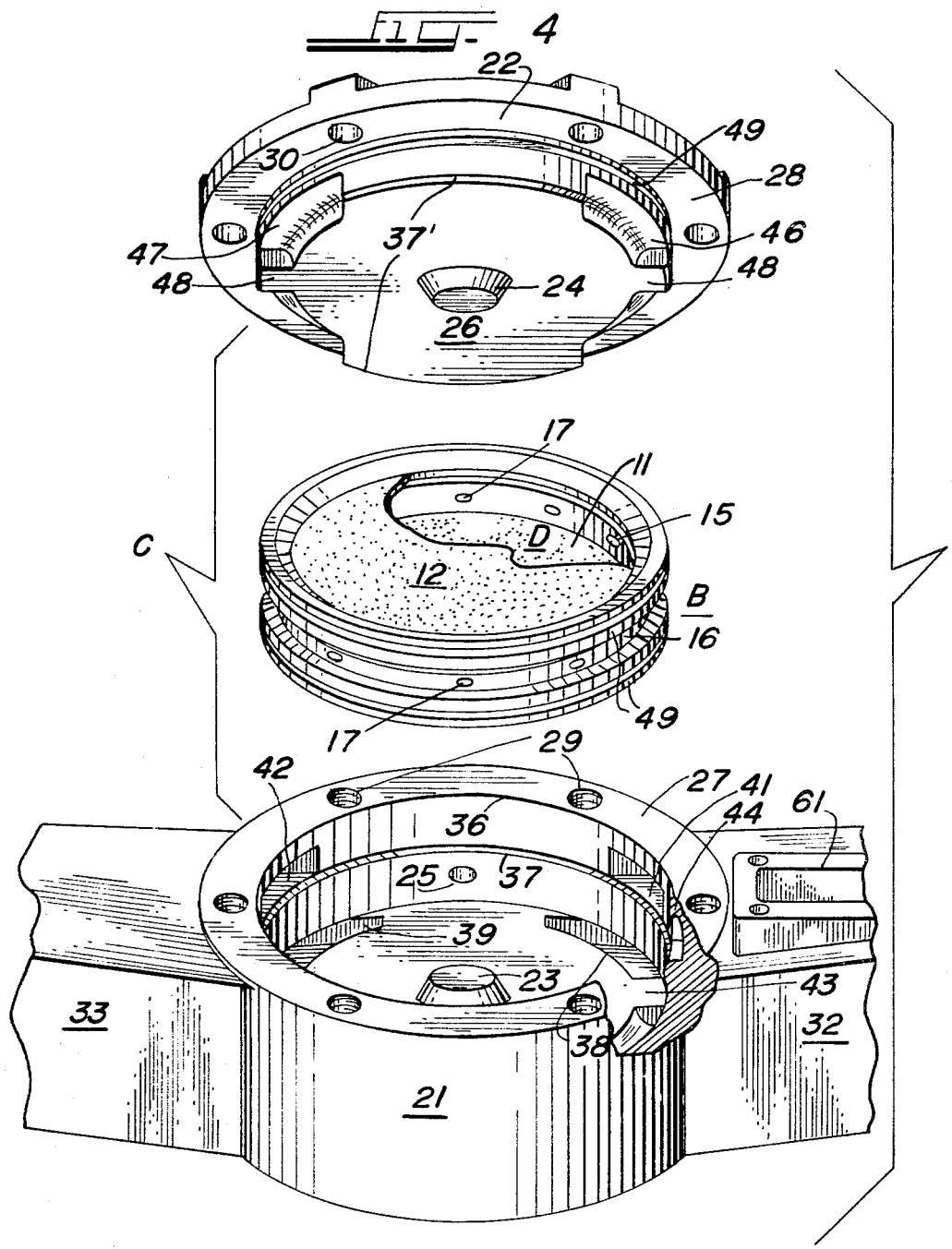
INVENTOR.
WILLIAM J. HASSELBERG United States Patent Office 3,397,871
Patented Aug. 20, 1968

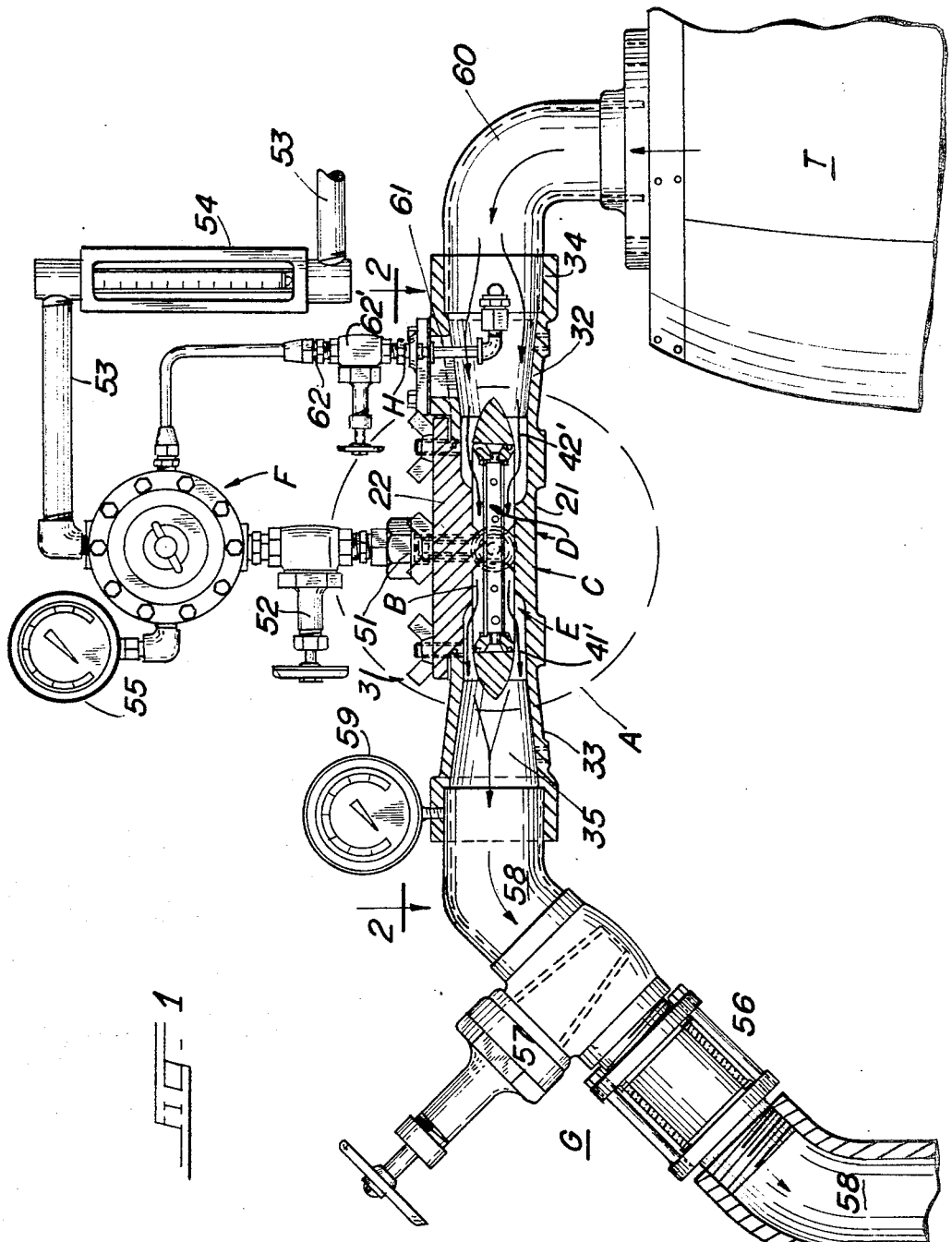

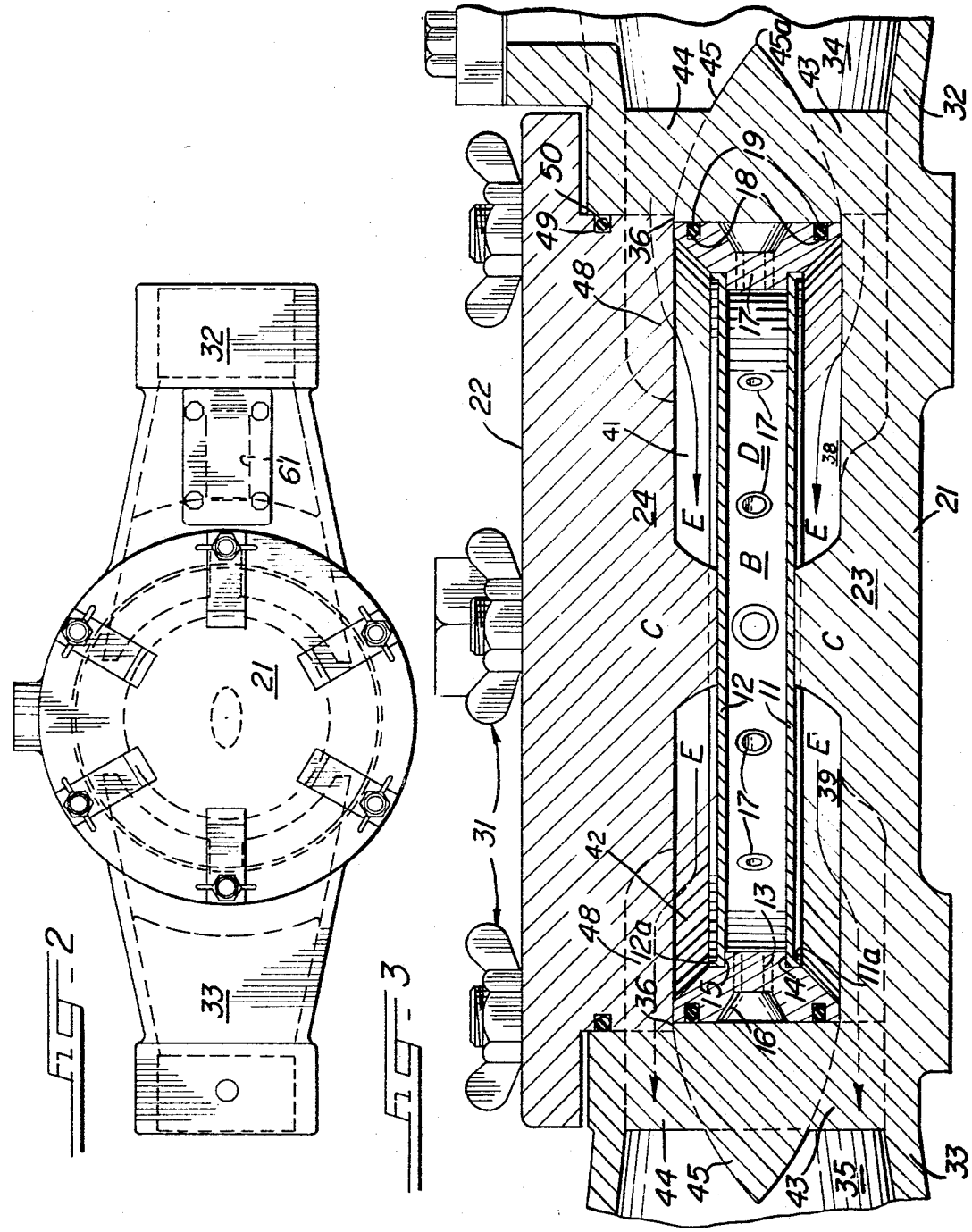

3,397,871
CARBONATOR
William J. Hasselberg, Forest Park, Ill., assignor to Hasselberg, Inc., West Seneca, N.Y., a corporation of New York
Filed Oct. 22, 1965, Ser. No. 501,662
6 Claims. (Cl. 261—75)

ABSTRACT OF THE DISCLOSURE

A beer carbonator apparatus having two elements embraced one within the other, the one of which provides a gas chamber within a beverage-flow channel between the two elements and through the porous walls of the first element the gas is injected as a very fine mist into the beverage passing through the beverage-flow channel between the elements, in a precisely controlled condition.

This invention relates to the carbonating of beverages.

The carbonating of beverages generally is effected by the pressed flow of carbon-dioxide ($CO_2$) into the beverage as it is conveyed into sealed receptacles, subject to later draft therefrom for consumption. Beer is one of the principal beverages of this kind. When the beverage is drawn from the storage receptacle for transfer to containers for marketing the beverage, there has to be a charging of the beverage with carbon-dioxide. With beer this re-carbonization has to be done with considerable care in order to get the desired quality thereof when it is to be drawn from containers for consumption. The desire is to so carbonate the beer that when poured from a marketing container into a container for drinking, the beer displays the quality expected of good beer. Carbonating means, heretofore and currently in use, have fallen far short of such attainment. Further, there is a great need for larger capacity carbonating devices.

The main objects of this invention are: to provide an improved structuring of a carbonator for charging a beverage before, or as, it is packaged for consumption; to provide an improved structuring of a carbonator of this kind especially adapted for charging beer that has been held in storage receptacles for a considerable period before being packaged for consumption; to provide a carbonator of this kind structured to inject into, and mix with the beverage flow from the storage receptacle, the carbon-dioxide ($CO_2$) in a mist-like form so that when the beverage is poured from the marketing container into a drinking container the beverage displays a quality closely simulating that of champagne; to provide a device of the class which will force rapid binding of the $CO_2$ gas with the beer flow; to provide means to split up the beer flowing through a conduit into two chambers, and injecting precisely controlled $CO_2$ gas into the beer flowing therethrough and, by continuing flow the charged beer returns to a conduit for packaging or storage; and to provide an improved carbonator of this kind of such simple construction as to make very economical the manufacture thereof, and exceedingly gratifying the beverage resulting from the use thereof.

In the adaptation shown in the accompanying drawings:

FIGURE 1 is a side elevational view, partly in cross-section, of a carbonator constructed in accordance with this invention;

FIG. 2 is a plan view, somewhat enlarged, of the main part of this improved carbonator taken on the plane of the line 2—2 of FIG. 1;

FIG. 3 is a much more-enlarged cross-sectional view of the portion of FIG. 1 shown in the circle A of FIG. 1, and FIG. 4 is an exploded view, in perspective, of the main parts of this carbonator as shown in the circle A of FIG. 1.

A carbonator embodying the foregoing concept comprises the two major elements B and C, the one embraced within and spaced from the other to provide respectively for the gas chamber D and the beverage-flow channel E associated with the hereinafter described conduits and instruments.

The major element B comprises a pair of members 11 and 12, in the form of disk-shaped plates, supported in axial-spaced relationship by a ring 13.

These two plate members 11 and 12 are made of a stable porous material, preferably sintered stainless steel with micron-size pores. Such material is available on the market with pore openings in the range of 5, 10, 20, 35, 65 and 165 microns. Plates with the smaller size pores are preferred for this development. Preferably, these plate-like members 11 and 12 have shallow perimetrical flanges 11a and 12a, respectively, to enhance their planar stability.

The ring 13, of this major element B, somewhat C-shape in cross-section, is formed with a pair of axially-spaced ledges 14 and 15 and a peripheral groove 16 (FIG. 3). The ring 13 tapers outwardly from the ends of the flanges 11a and 12a, of the plates 11 and 12, when seated on the ledges 14 and 15. The groove 16 provides for the flow of gas around the ring 13 for entrance of the gas into the chamber D through a series of peripherally-spaced holes 17.

The ring 13 is exteriorly dimensioned for telescopic insertion into the hereinafter-described member of the element C. At opposite sides of the groove 16 the ring 13 is peripherally recessed to provide slots 18 for the seating of fluid-sealing C rings 19.

The major element C comprises a pair of member 21 and 22 having small centrally-integrated hubs 23 and 24 which provide support for the major element B in functioning position for the discharge of gas into the beverage-flow channel E. A port 25 (FIG. 4) in the member 21 provides for the entrance of the carbonating gas flow into the groove 16 of the ring 13 for entrance through the holes 17 into the chamber D.

The members 21 and 22, of the major element C, in a general sense are disk-shaped. The member 21 has an upwardly-open circular chamber wherein is housed the major element B. The other member 22 is formed with an under-face head 26 dimensioned to telescopically fit in and close the open end of the chamber with the face of hub 24 resting on the element B.

The flat annular rim surfaces 27 and 28 of the respective members 21 and 22 are formed with a series of holes 29 and 30 for the insertion of wing-nut-and-bolt type of fasteners 31 for securing the members in the fluid-tight contact.

The member 21, of the major element C, has integrated therewith diametrically-opposed extensions 32 and 33 which define the respective inlet and outlet ports 34 and 35 to and from the beverage-flow channel E. The internal circular wall 36 of the member 21 is formed with a ridge 3 medial of the internal face of the base of the member and the rim surface 27. Such a ridge 37 is for the seating of the beveled edge 37' of the head 26 of the member 22. Member 21 is formed with a pair of inlet ports 38–41 located below and above ridge 37 respectively and a pair of diametrically opposed outlet ports 39–42 respectively. The pairs of ports are defined by slots 42' and 41' respectively (see FIG. 1) and are separated by narrow dividers 43–44 respectively. (See FIG. 3).

These dividers 43 and 44, of the member 21, are each integrated with a rib 45 (FIG. 3) that extends radially outward and which is tapered to a knife-like edge 45a. Such formed ribs 45 are of an arcuate length substantially equal to the diameter of the respective inlet and outlet ports 34 and 35. The function of such ribs 45 will be explained presently.

The member 22, of the major element C, has the head 26 thereof peripherally recessed to provide pairs diametrically-opposed of pockets 46 and 47 each pair of which is separated by a divider 48. Thus, when the member 22 is set in the member 21, with the element B interposed as shown in FIGS. 1 and 3, the pairs of pockets 46 and 47 register respectively with the pairs of slots 41' and 42' and the dividers 48 contactively register with the dividers 44. The head 26 of the member 22 is peripherally recessed to provide a slot 49 for the seating of fluid-sealing O ring 50.

Accessory and functioning parts essential for this carbonator comprise a gas-flow diaphragm regulator F, of well known design, a quality control unit G, and a supplemental gas-sparger or -duster H, together with the requisite conduits for connecting these accessories to the above-described carbonator elements B and C. All of these accessories are conventional in nature and use and are imperative to securing the desired and improved results with the above-described elements B and C. The assembled and functioning relationship of these accessories is shown in FIG. 1.

The gas regulator F is connected to the port 25 (member 21 of the element C) (FIG. 4) by a conduit 51. In this conduit 51 is interposed a valve 52. Such a regulator F is connected by a conduit 53 to a source of carbonating gas (not shown) with an interposed gas-flow rater 54 (FIG. 1). A gas gage 55 also is connected to the gas flow regulator F to quickly visualize the condition of the flow through the regulator F.

The quality-control unit G involves sight-glass nipple 56 and a juxtaposed control valve 57 interposed in a beverage-flow outlet conduit 58 connected to the extension 33 of the member 21 of the element C.

The beverage flow inlet extension 32 is connected by a conduit 60 to a beverage storage or flow receptacle such as partially indicated at T in FIG. 1.

When desired, a suitable gas-sparger or -nozzle H may be interposed in the extension 32 of the member 21 of the element C (FIG. 1). For this purpose the extension 32 is formed with an opening 61 wherein the unit H may be set and connected by a suitable valve-controlled conduit 62 to the regulator F. The unit H is especially used to inject lost $CO_2$ gas into beer which has already been charged and stored in tanks, and when the tanks develop a leak whereby the $CO_2$ gas escapes from the beer. To use the device H the valve 52 is closed and the valve 62' is opened. Thus the added $CO_2$ gas is jettisoned into the flow of beer to bring it back to the desired quality.

The most significant aspect of the continuous, automatic operation of this main carbonator is that the flow of the incoming beverage is directed into two paths in the beverage-flow channel E one below and one above the gas supply element B, as indicated by the arrows in FIGS. 1 and 3. As the beverage enters the inlet port 34, within the extension 32, the knife-edge 45a form of the rib 45 tends to split that flow into these lower and upper paths through these slots 41' and pockets 46 slots 42' and pockets 38 in the member 21. Meanwhile the gas is forced through the port 25, in the member 21, into and around groove 16, in the ring 13, and through the openings 17 into the chamber D. Forcing such passage of the beverage flow under and over the plates 11 and 12, defining this chamber D, incorporates into the beverage the fine gas mist that is pressured through the micron pores in these plates 11 and 12.

It should be noted that the pairs of pockets 38–39, in the base of the number 21, extend inwardly of the perimeter of the lower plate 11 beyond that of the respective pockets 46 and 47 in the member 22 relative to the plate 12. This is done in the expectation of securing an equal penetration of the gas mist into the beverage passing through these lower and upper paths of the beverage flow channel E.

As the carbonated beverage is examined, passing through the glass nipple 56, an experienced operator can determine from the cloudy condition of the beverage, whether there is need for more or less carbonation to get the desired results within the beverage delivered from the outlet end of the conduit 58. As circumstances may require, the experienced operator will adjust one or more of the accessories to the gas flow regulator F to secure the desired results.

Should the operator wish to reduce the flow rate of the beer through the carbonator, this can be accomplished by closing outlet control valve 57 until the desired flow rate is obtained. When closing this outlet control valve 57, the fluid and beer pressure will increase in the carbonating device, thus causing a back pressure on the $CO_2$ gas dispersion plates. This increase in pressure will automatically cause the $CO_2$ gas port hole to adjust its closure in the diaphragm type $CO_2$ gas regulator F and thus automatically maintain a $CO_2$ gas flow rate through the gas dispersion plates to correspond with the reduced beer flow.

In the event the outlet control valve 57 is left in a fully opened position, and the beer is being pumped through a beer filter (not shown), any restriction through the beer filter which may set up a pressure increase in the carbonator, the $CO_2$ gas entering the beer flow through the gas dispersion plates is automatically controlled for the precise amount of $CO_2$ gas for which it was originally set.

Again, once this adjustment has been made, and if any restrictions develop on the outlet side of the carbonating device which may cause an increase in pressure in the carbonator, the $CO_2$ regulator F automatically compensates for this $CO_2$ gas flow into the beer and the unit continues fully automatic in operation.

Should it be desired that a different size stainless steel dispersion plate with larger micron openings be installed, this is easily and readily accomplished simply by removing the cover of the unit and replacing with new plates.

It should be obvious that the knife-like forward members 45a divide the flow of beer from the conduit 32 for splitting the flow in two to pass into the circular flow chambers E and thereby prevent any back flow in conduit 32. Also the after member 45 smooths out the divided flow from the chambers E as the beer flow merges into condiut 33.

Although but one specific embodiment of this invention is herein shown and described, it will be understood that numerous details of the construction shown may be altered or omitted without departing from the spirit of the invention as defined by the following claims.

I claim:

1. A beverage carbonator comprising, a first element defining a gas-flow chamber having a gas-inlet, said element being of sintered stainless steel with pores of micron size, a second element enclosing the first element and defining a beverage-flow channel around the first element between radially-spaced inlet and outlet ports, each of said elements being in the form of a pair of axially spaced circular members, said first element being supported in said second element by axially spaced hubs, a peripheral groove in the side wall of said first member and provided with a series of apertures extending into the interior of said first member, a pair of diametrically opposed knife like ribs disposed radially outward into the respective beverage inlet and outlet ports to split the beverage flow in half for entry into and out of the gas flow chamber and means for connecting the first element to a source of carbonating gas, and other means for connecting the inlet and outlet ports of the second element respectively to a beverage storage-receptacle and to a source for discharging the carbonated beverage into containers.

2. A beverage carbonator as set forth in claim 1 wherein the ring has the ledges spaced axially inwardly from the opposite planar faces thereof and radially inward from the perimetrical portion thereof and which peripheral portion has an exterior channel communicating with the chamber through radial holes in the ring perimetrical portion.

3. A beverage carbonator as set forth in claim 2 wherein the one of the second pair of members has diametrically-opposed extensions defining the inlet and outlet ports to and from the beverage-flow channel and also has a circular opening in one wall between the extensions, the other of the second pair of members is disk-shaped and seats in and forms a closure for the circular opening in the first of the second pair of members, and means removably securing the second member in fluid-tight position to the first member.

4. A beverage carbonator comprising,
 (a) a first pair of disk-shaped members of micron-porous stable material,
 (b) a ring having axially-spaced ledges supporting the first pair of members to form a circular chamber therebetween and having the ledges spaced inwardly from the perimetrical portion of the ring, which perimetrical portion has a channel communicating with the chamber through radial holes in the perimetrical portion,
 (c) a second pair of disk-shaped members having integrated and axially-aligned hubs supporting the first pair of members and being internally contoured to define substantially equal beverage flow channels around the opposite faces and perimeters of the one pair of members,
 (d) one of the second pair of members having diametrically-opposed extensions defining the inlet and outlet ports to the beverage-flow channel and also having a circular opening in one wall between the extensions,
 (e) the other of the second pair of members being disk-shaped and seated in and forming a closure for the circular opening in the first of the second pair of members,
 (f) a gas inlet-flow conduit connected to admit gas flow into the peripheral channel in the ring, and between the first pair of members
 (g) a gas-flow regulator interposed in the gas inlet-flow conduit, and mounting thereon a pressure indicator,
 (h) a carbonated beverage-flow conduit connected to the outlet port in the second pair of members for the discharge of the carbonated beverage into containers and having a control valve interposed therein, and
 (i) a sight-glass means interposed in the beverage-flow conduit for determining the carbonated character of the beverage being directed into the containers.

5. A beverage carbonator as set forth in claim 4 wherein
 (j) a gas sparger or duster nozzle is interposed in the inlet-flow extension of the second pair of members, and
 (k) a valve-controlled conduit connecting the gas sparger or duster nozzle to the gas-flow regulator.

6. The method of carbonating beer comprising directing the flow of beer through a conduit then splitting the flow of beer in the conduit into two equal circular relatively flat chambers, then injecting finely divided carbonated gas mist into the beer in said chambers simultaneously and evenly, then drawing the carbonated beer from said chambers; into a sight inspection area, and controlling the rate of flow of said beer through said conduit.

References Cited

UNITED STATES PATENTS

| | | |
|---|---|---|
| 531,356 | 12/1894 | Barus. |
| 1,405,775 | 2/1922 | Friedrichs. |
| 2,303,716 | 12/1942 | Arndt. |
| 2,378,029 | 6/1945 | O'Brien _____ 261—75 |
| 3,064,680 | 11/1962 | Winslow _____ 261—75 XR |
| 3,256,802 | 6/1966 | Karr. |

HARRY B. THORNTON, *Primary Examiner.*

E. H. RENNER, *Assistant Examiner.*